United States Patent
Baker

(10) Patent No.: US 6,985,569 B2
(45) Date of Patent: Jan. 10, 2006

(54) SYSTEM AND METHOD FOR IDENTIFYING PARTIES IN BILLS FOR COMMUNICATIONS SERVICES

(75) Inventor: Nathan Bryant Baker, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 335 days.

(21) Appl. No.: 10/376,935

(22) Filed: Feb. 28, 2003

(65) Prior Publication Data

US 2004/0170260 A1    Sep. 2, 2004

(51) Int. Cl.
*H04M 15/00*    (2006.01)
*H04M 3/42*    (2006.01)

(52) U.S. Cl. .................................. 379/126; 379/218.01

(58) Field of Classification Search ........... 379/142.01, 379/88.01, 88.02, 88.19, 88.2, 142.06, 142.04, 379/218.01, 126, 127.01, 127.03, 127.04, 379/127.05, 115.01, 223
See application file for complete search history.

(56) References Cited

U.S. PATENT DOCUMENTS

| 5,835,856 A * | 11/1998 | Patel ........................... 455/406 |
| 6,459,779 B2 * | 10/2002 | Wardin et al. ......... 379/112.01 |
| 6,466,784 B1 * | 10/2002 | Cox et al. ................ 455/414.2 |
| 6,668,046 B1 * | 12/2003 | Albal .......................... 379/119 |
| 2001/0017915 A1 | 8/2001 | Wardin et al. |

* cited by examiner

*Primary Examiner*—Rexford Barnie
(74) *Attorney, Agent, or Firm*—Kaye Scholer LLP

(57) ABSTRACT

In an information assistance system, when a first party calls the service to request a communications number (i.e., phone number) of a second party, an indicator of the second party, such as the second party's name, is inserted into an event record to be provided to a billing platform. The indicator may also be the second party's address, instead of or along with the second party's name. The name may thereby be readily provided in a bill for the call. In a carrier network, the name of a second party called by a first party is inserted in an event record, so that the second party's name may be included in a bill for the call. The name may be determined by submitting the second party's communications number, which may be derived from call set up signals, to a database correlating communications numbers with corresponding parties' names. This may take place while the communication is being connected. Methods and systems are disclosed.

42 Claims, 7 Drawing Sheets

10

400

SYSTEM AND METHOD FOR IDENTIFYING PARTIES IN BILLS FOR COMMUNICATIONS SERVICES

FIELD OF THE INVENTION

The invention relates to a communications system and method, and, more particularly, to a communications system and method for identifying a party, such as a called party or a party whose number is requested in an information assistance call, in bills for communications services.

BACKGROUND OF THE INVENTION

It is a common experience to use a wireless or wireline telephone, and other such communications devices, to call a telephone operator for information assistance. In a typical information assistance call, a caller (customer) identifies to the operator the name and address, or sometimes city or area code, of a party whose telephone number is desired. In response, the operator locates the desired destination number using a computer database, for example. The destination number may be provided to the customer by a computerized voice server, and the customer may be afforded the option of being connected to the destination number without the need to first terminate the information assistance call.

Even though a customer subscribes to a telephone service provided by a particular carrier, such as AT&T Wireless Services Inc., or branding partner, such as Virgin, the information assistance service system accessed through the telephone service may be contracted by the carrier to different independent contractors. Therefore, when a subscriber to the carrier makes an information assistance call by dialing such typical access digits as "411," "*555," "555-1212," "00," "1-800-555-1212," etc., because of the contractual relationship, the carrier routes the information assistance call to its contracted information assistance service system to handle the information request.

Independent information assistance service providers may offer different information assistance services and service features in addition to directory assistance. For example, upon request, an operator may provide a user with information on regional restaurants, movie listings, directions to various places, etc., as well as the ability to purchase goods and services. The assignee of the present application is an information assistance service system which offers, among others, personalized services and special service features-that are different than or lacking from other providers. For instance, one such service feature is a StarBack® service feature described in U.S. Pat. No. 5,797,092, whereby a caller, after being connected to a desired party, may be connected back to the information assistance service system by pressing a "*" key on their telephone, or otherwise issuing a command (saying the word "operator", for example). Examples of the assignee's personalized services include private directory assistance and foreign language directory assistance, which are described, for example, in U.S. Pat. No. 5,966,437 and International Publication No. WO 01/35621.

When a customer is connected to an information assistance system contracted by the customer's carrier, the customer is typically billed for information assistance services provided in the call and connection charges, through their carrier. These information assistance services include directory assistance and enhanced services, such as the aforementioned STARBACK® service. The connection charges include any applicable long distance and/or local toll charges (imposed by the carrier), any airtime charges (imposed by the carrier), and any other charges, such as paging and messaging charges, which are imposed or incurred when performing the information assistance service. Charges imposed by the information assistance service system may be billed on a per call basis, or may be billed, depending upon a variety of factors, such as the duration of the information assistance/operator time, or the event type or class of information searched.

Bills are typically compiled from event records, such as call detail records ("CDRs"), generated at a call center. For example, upon receipt of a directory assistance call, a carrier switch may generate a CDR and direct the call to the contracted information assistance service system. A servicing switch at the information assistance service system may generate a CDR upon receipt of the call from the carrier switch. Each "event" during the course of a call may cause generation of a CDR by a component of the call center involved in that event. An "event" may be any activity at the call center related to handling of the call. Examples of events include receiving an information assistance call, queuing a call while waiting for an operator to become available, connecting the call to an available operator, conducting a search of a database for directory assistance or other services, activating a voice response unit (VRU), connection to a destination number, etc. The generation of CDRs for such events is described in application Ser. No. 09/777,061, filed on Feb. 5, 2001, which is assigned to the assignee of the present invention and is incorporated by reference, herein.

The CDR or CDRs generated during a communication contain the communication related information necessary to compute a bill for the communication, such as call duration, toll connection, information assistance service, and the type and/or class of information service provided, to the extent that charges vary depending upon the type of information service provided. CDRs are sent to a billing platform, which compiles the CDRs for each call and for calls for each customer. The billing platform may be at the carrier, information assistance service system or a third party to generate a bill.

Typical bills for direct dial telephone services identify the date, time, called phone number and duration of the call, and the geographic location of the called party. Information assistance calls, which may be included in the same bill as direct dial calls provided by the carrier, may only include the date of the information assistance call. It may also include the requested phone number. If the information assistance call is connected to the requested phone number, the date, time, phone number and geographic location of the called party, which may be an individual or business, for example, will appear on the bill, as if the call was dialed directly by the customer.

When a customer reviews a telephone bill, the customer may not recognize the called number or remember who was called on a particular date at a particular geographic location. Believing that they have been misbilled, the customer may call their carrier to request credit for the call. Often, the call was not misbilled, but much time and expense is accrued to clarify the situation. Perceptions by customers of being misbilled, even when erroneous, may also generate ill will. An improved system for handling credit inquiries and processing credit requests is described in more detail in U.S. application Ser. No. 10/160,415, filed on May 31, 2002, assigned to the assignee of the present application and incorporated by reference herein.

U.S. Patent Application Publication US 2001/0017915 A1 (the '915 application), published on Aug. 30, 2001, describes a system and method of creating a billing record including a called party's name, to facilitate review of a bill by a customer. In the '915 application, a phone number of a called party is extracted from an original event record after a call is completed, by a billing system. A database correlating phone numbers with corresponding parties' names is queried to identify the name of a party associated with the called number. A modified call record is then created including the party's name. A billing record is created from the modified call record. This process is repeated for each call in a billing time period to create a bill. While providing a called party's name in a bill would eliminate some erroneous requests for credit, the disclosed method is complex and may be expensive to implement.

SUMMARY OF THE INVENTION

The embodiments of the present invention provide a simple way to convey information to a billing platform to incorporate a second party's name in a bill.

In an information assistance service system, a first party calls or otherwise communicates with the system to request a phone number or other such communications number of a second party. In one aspect of the present invention, in an information assistance service system, at least one indicator of the second party, such as the name and/or address of the second party, is inserted into an event record, such as a Call Detail Record ("CDR"), so that it may be readily included in a bill for the service. Since the first party provides the second party's name to the information assistance service system, the name is readily available for insertion into the event record without requiring that the billing platform search for the name, as in the prior art.

In another aspect of the invention, a carrier network identifies and inserts at least one indicator, such as a name and/or address of a second party being called or otherwise communicated with by a first party initiating the communication, into the event record. In this case, the carrier network identifies the communications number of the second party, from call set up signals, for example, and searches for a name corresponding to the communications number. The carrier network may search a database correlating communications numbers and indicators of a party associated with a respective communications number. The database may be part of the carrier network or may be part of a third party, such as an information assistance service system. A directory assistance database of an information assistance service system may be adapted to be searched for an indicator corresponding to a number. The event record may be generated and the indicator inserted in real time, during processing of the communications connection between the first and second party.

In accordance with one embodiment of the invention, a method of operating an information assistance service system is disclosed comprising establishing a communication with a first party seeking a communications number of a second party. A name of the second party is received from the first party and an event record related to the communication is generated including at least one indicator of the second party, such as the second party's name and/or address. For example, the second party's name and/or address may be stored in a memory location and copied into the event record. The second party's name may be copied from the first memory location into a second memory location and from the second memory location into the event record. The second memory location may be part of the same memory device as the first memory location, or a separate memory device. For example, the second memory location may be associated with a database server, which may search a database for a communications number associated with the name stored in the second memory location. The first memory location may be associated with another component of the system. The database may be a national, a local, a private, a proprietary, a shared and/or an international database. The second party's name may be input to the memory by an input device or a voice recognition unit, for example. The event record including the second party's name, may be sent to a billing platform, which may be part of the information assistance service system, part of a carrier or part of another third party. The event record generated may be an original event record. There is no need to modify event records, as in the prior art.

In another aspect of this embodiment of the invention, an information assistance communications system is disclosed comprising means for receiving signals to establish a communication with a first party requesting the communications number of the second party, means for receiving a name of the second party from the first party and means for generating an event record related to the communication, including at least one indicator of the second party.

In another aspect of this embodiment, an information assistance communications system is disclosed comprising an interface to receive signals to establish a communication with a first party requesting a communications number of a second party and a processor coupled to the interface. The processor is programmed to cause generation of an event record related to the communication, including at least one indicator of the second party, such as the party's name and/or address. The system may further comprise a database correlating indicators of parties and corresponding communications numbers. The system may further comprise an operator or a voice recognition unit enabling input of a party's name. The system may further comprise memory to store a party's name to be searched. The processor may be programmed to cause the party's name stored in memory to be inserted into the event record. Second memory may also be provided. The processor may copy the party's name from the first memory to the second memory, and from the second memory to the event record.

In accordance with another embodiment of the invention, a method of operating a communications system is disclosed comprising processing a communications connection between a first communications device of a first party initiating a communication with a second communications device of a second party. An event record is generated related to the communication, including at least one indicator of the second party, such as the second party's name and/or address. The event record is generated during processing of the communications connection. The at least one indicator may be identified and inserted into the event record during processing of the communications connection. The indicator may be identified by a database correlating communications number with indicators. The communications number may be derived from call set up signals. The database may be part of a third party, such as an information assistance service system.

In another aspect of this embodiment of the invention, a communications system is disclosed comprising means for processing a communications connection between a first communications device of a first party initiating a communication and a second communications device of a second party and means for generating an event record related to the communication, including at least one indicator of the second party, during processing of the communications connection.

In accordance with another aspect of this embodiment, a communications system for establishing a communication is disclosed comprising an interface to receive signals from a first communications device of a first party to process a communications connection with a second communications device of a second party and a processor programmed to generate an event record including at least one indicator of the second party, during processing of the communications connection. The processor may be programmed to generate the event record, access a database correlating communications numbers with indicator's of a party associated with a respective communications number and insert a retrieved indicator into the event record. The database may be part of the communications system or may be part of a third party, such as an information assistance service system. The indicator may be a name and/or address of a party associated with the communications number, for example.

In accordance with another embodiment of the invention, a method of operating a communications system is disclosed comprising establishing a communication connection between a first communications device of a first party and a second communications device of a second party. At least one indicator of the second party is then inserted into an original event record generated by the communications system for the communication.

In accordance with another embodiment of the invention, a method of operating a communications system is disclosed comprising connecting an information assistance communication to an information assistance service system, wherein, in the communication, a first party is seeking a communications number of a second party. A communications connection between the first party and the second party is processed after the communications number of the second party is identified. At least one indicator of the second party is inserted into an event record generated by the communications system for the connection, while processing the connection. The indicator, such as the second party's name and/or address, may be obtained from a database, which may be part of an information assistance service system, for example.

In accordance with another aspect of this embodiment, a communications system is disclosed comprising an interface and a control device coupled to the interface. The control device is programmed to direct information assistance communications from a first party seeking a communications number of a second party to an information assistance service, process a communications connection between the first party and a second party and generate an event record of a communication between the first party and the second party, including at least one indicator of the second party, during processing of the communications connection.

In accordance with another embodiment of the invention, a method of operating a communications system is disclosed comprising receiving signals from a first communications device of a first party to establish a communications connection with a second communications device of a second party. A communications number of the second communications device is derived from the signals. The communications number is submitted to a database correlating communications numbers and at least one indicator of a party associated with a respective communications number. A retrieved indicator is inserted into an event record.

In accordance with another aspect of this embodiment, a communications system is disclosed comprising an interface to receive signals from a first communications device of a first party to establish a communications connection with a second communications device of a second party and a control device coupled to the interface. The control device is programmed to derive a communications number of the second communications device from the signals, submit the communications number to a database correlating communications numbers and indicators of party's associated with a respective communications number, and insert a retrieved party's name into an event record.

In accordance with another embodiment, a method of generating a billing record for a service provided by a communications system to a first party is disclosed comprising receiving an event record from the communications system related to the service, the event record including at least one indicator of a second party, and creating a billing record including the indicator, based, at least in part, on the event record.

DETAILED DESCRIPTION

In accordance with one embodiment of the present invention, an indicator, such as a name and/or address, of a party associated with a communication, is included in a bill related to the communication. For example, in an information assistance call, where a first party calls an information assistance service system to request a phone number or other such communications number of a second party and optionally be connected to the second party, an indicator, such as the name and/or address of the second party, is included in a bill for the information assistance call. The party may be an individual or a business, for example. In another example, in a phone call or other such communication from a first party to a second party, the name and/or address of the second party is included in a bill for the call. The second party's name may be inserted into an event record, such as a Call Detail Record ("CDR"), in real time, during the processing of the communication. By including the name of the party associated with the communication in a bill, a customer's review of the bill is facilitated and improper requests for credit may be decreased. Inserting the name in real time, during call processing, is more efficient than searching for party's names and modifying event records during off-line bill processing, as in the prior art. This is particularly true in the case of information assistance calls, where the party's name is readily available because it is provided by the customer calling for information assistance.

Figure 1:
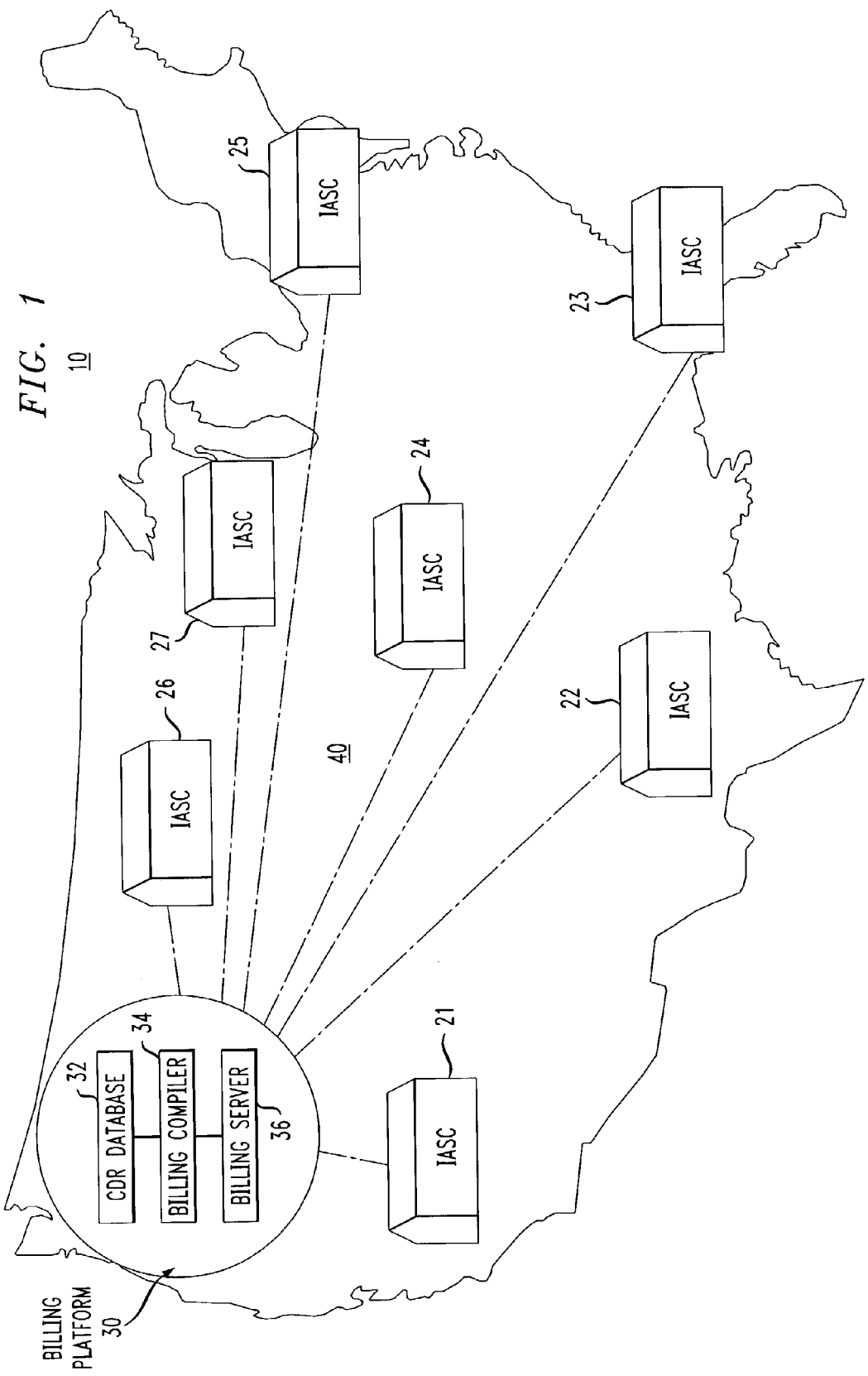
FIG. 1 illustrates a communications system for providing information assistance services and implementing an embodiment of the present invention.

FIG. 1 is an example of a communications system 10 implementing embodiments of the present invention. In this example, the communications system is an information assistance service system. The information assistance service system 10 includes a plurality of operators dispersed throughout a wide coverage area in information assistance service centers ("IASCs") 21 through 27. IASCs 21 through 27 are coupled to each other and to one or more billing platforms 30 through a network 40. In this example, each of IASCs 21 through 27 covers one or more regional coverage areas. The network may be a wide area network ("WAN") 40 covering an extensive area, for example. WAN 40 can be an Internet-based network, such as the World Wide Web, or a private intranet based network. The information assistance service system may be accessed directly by a user on a wireline phone, wireless phone, personal data assistant ("PDA"), personal information manager ("PIM"), Blackberry and other communications devices. While information assistance service system 10 in this example includes a plurality of IASCs 21 through 27, the invention may be implemented in a system including a single IASC coupled to a billing platform 30.

Billing platform 30 may comprise a call detail record ("CDR") database 32, a billing compiler 34 and a billing server 36. CDR database 32 collects and stores CDRs generated by IASCs 21 through 27. Billing compiler 34 is a processor or computer that compiles CDRs related to the same call and to the same customer. CDRs related to the same call may be identified by a common identification number assigned to each CDR by an IASC 21 through 27 handling a particular communication, as described below. CDRs related to the same customer may be identified by an automatic number identification ("ANI") of a communications device (such as a wireline or wireless phone) associated with a particular customer and incorporated in the CDR. A customer may have multiple communications devices with respective ANIs. Each ANI may cause generation of a separate bill or the charges for each communications device may also be compiled into a single bill.

Billing server 36 generates a billing record, which may be a customer bill, or a precursor to a customer's bill, based on the compiled CDRs, which include information from which charges may be derived, as discussed above. Billing server 36 computes appropriate charges for each communication based on stored rate information and the CDRs, formats each bill and prints the bill to be mailed to a customer. An electronic bill may be generated instead of or along with the printed bill, for being e-mailed or otherwise sent electronically to the customer. The bill may also be made available through a website of the communications service, for example. Billing server 36 also stores the generated bills and the underlying CDRs in appropriate memory (not shown) for later reference. If the billing hub is part of a third party, a precursor to a bill is typically generated by billing server 36. The precursor is provided to information service system 10 for final formatting and presentation to a customer, by mail, e-mail or through the website.

Billing platform 30 may be part of information assistance service system 10, part of a carrier, and/or it may be a third party. While a single CDR database 32, billing compiler 34 and CDR server 36 are shown, it is understood that multiple databases, compilers and servers may be used.

Figure 2:
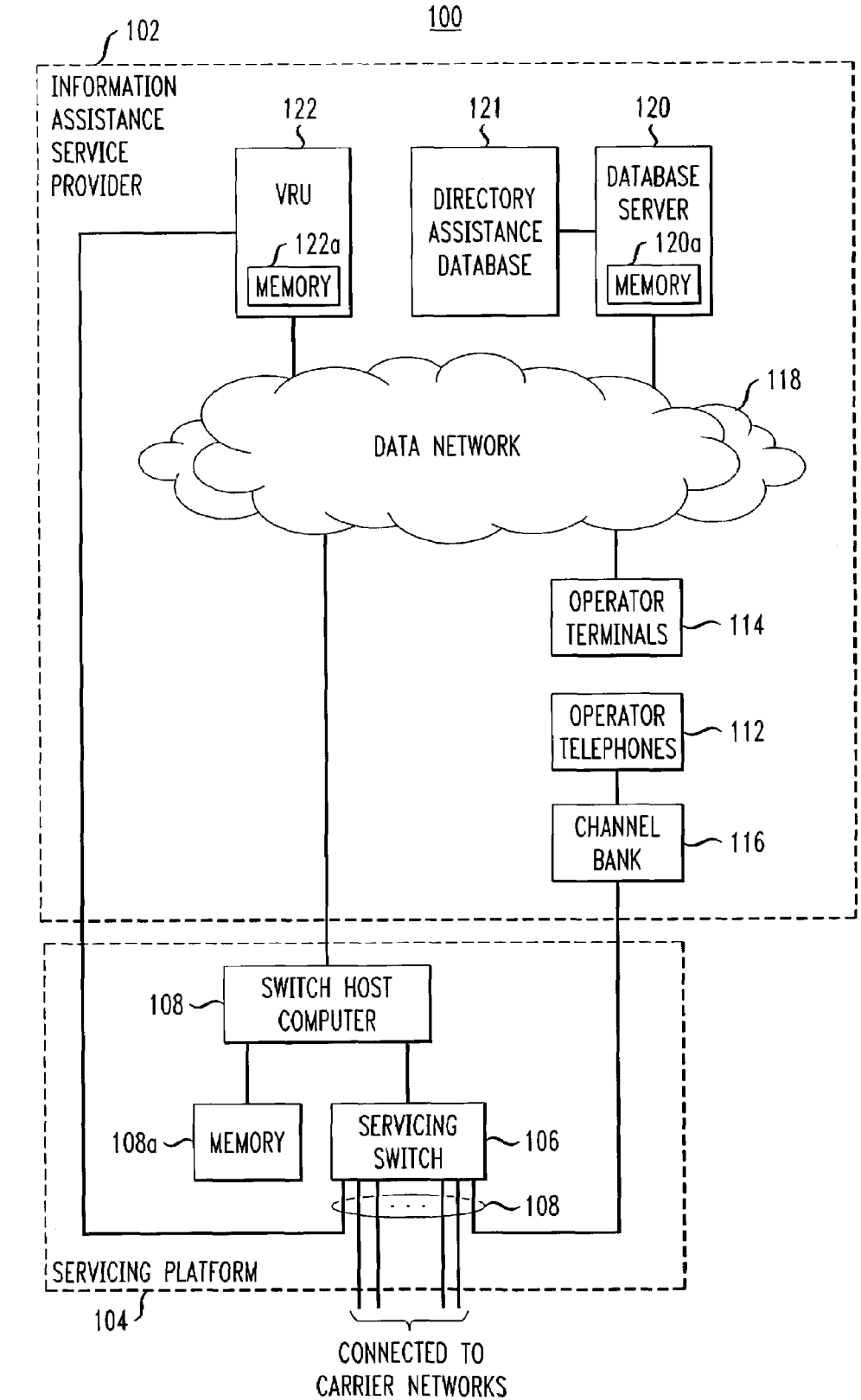
FIG. 2 is an example of an IASP of FIG. 1.

FIG. 2 is an example of an IASC 100 (generically representing each of IASC 21 through 27), embodying the principles of one embodiment of the invention. IASC 100 provides information assistance services and enables the name and/or address or other such indicator of a party called or a party whose number is requested, to be provided in a billing record, in accordance with an embodiment of the invention. IASC 100 includes information assistance service provider ("IASP") 102 and servicing platform 104. Servicing platform 104 may be part of or separate from IASP 102. Servicing platform 104 may be located in the same geographic area as or in a different geographic area than the associated IASP 102.

Servicing platform 104 includes an interface, such as a servicing switch 106, and a switch host computer 107. Switch 106 is a conventional switch connected via one or more external T1 links 108, including digital T1 links, to one or more carrier networks (not shown in FIG. 1). T1 links 108 may be voice, data or video connections through which incoming and outgoing voice, data, and/or video communications can be made. Outgoing communications may be placed over the same or different carrier networks than the carrier network on which the incoming communication was received. Switch 106 includes digital signal processing circuitry (DSPs). Thus, switch 106 can be programmed and reprogrammed to function as, among other things, call progress analyzers (CPAs), call progress generators (CPGs), multi-frequency (MF) tone generators/detectors, dual-tone multi-frequency (DTMF) generators/detectors, and/or conferencing units, depending upon the demand placed on IASP 102 and switch 106 for each corresponding function.

Figure 7:
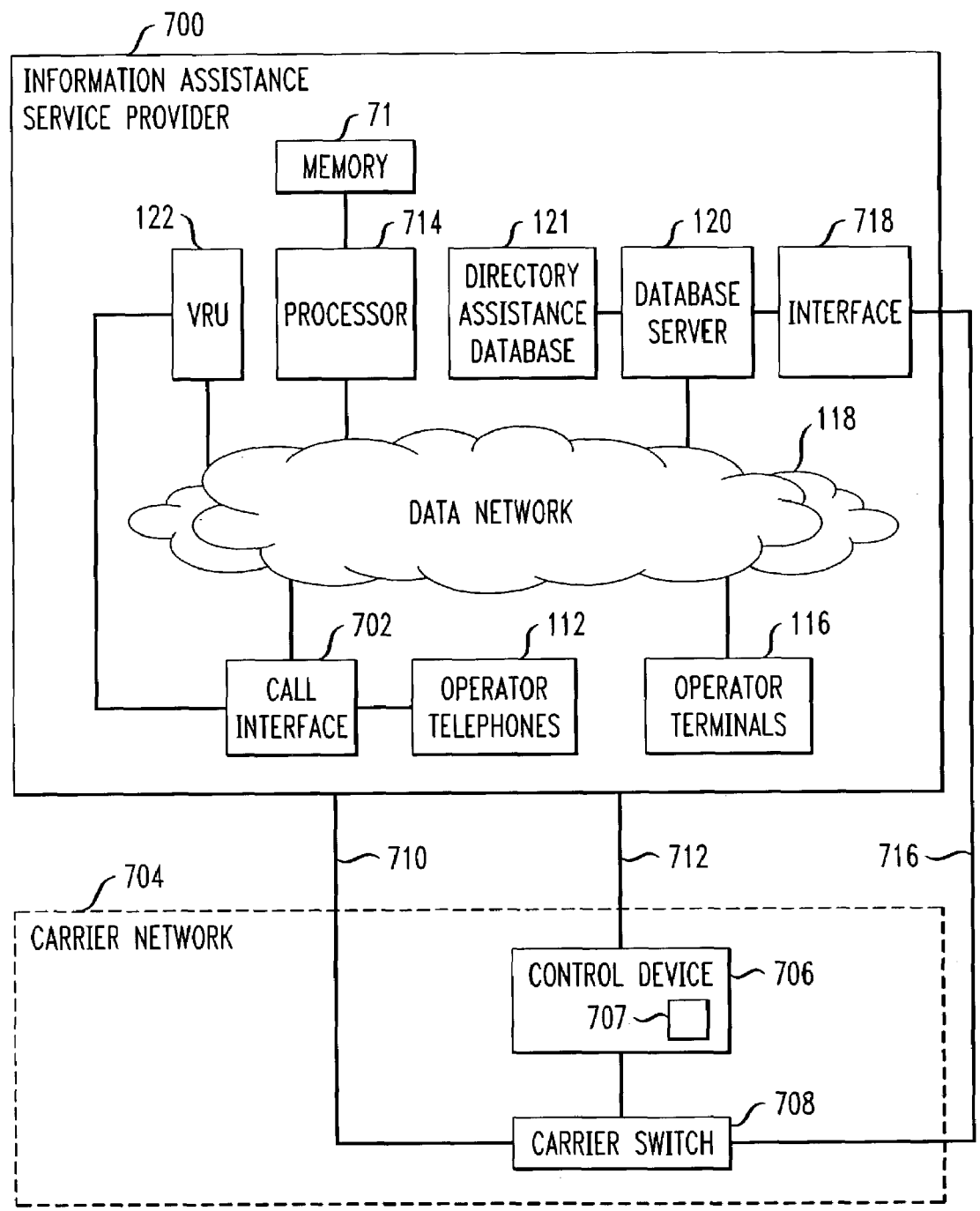
FIG. 7 is a block diagram of another configuration of an IASP in FIG. 1.

Switch host computer 107 may be programmed to control the operation of servicing switch 106, as well as the operation of the components of IASP 102 described below. Switch host computer 107 includes memory 107a. Switch host computer 107 and switch 106 may be private branch exchange ("PBX") components. In FIG. 7, in contrast, an IASP 700 is shown without a PBX switch and host computer.

IASP 102 includes operator devices, such as operator telephones 112 and operator terminals 114, handled by a respective operator. Each terminal 114 may include memory 114a, and a monitor, mouse and keyboard with associated dialing pad (not shown). Operator telephones 112 are coupled to channel bank 116 in IASP 102. Channel bank 110 is coupled to switch 106 in servicing platform 104 via an internal T1 link 108.

Operator terminals 114 are coupled over data network 118 to database server 120, which is coupled to directory assistance database 121. While only one database server 120 and database 121 are shown in FIG. 2, multiple servers and/or databases may be provided. Terminals 114 are generally provided with web browsing capabilities, telephone facilities and fully-featured operator user interface applications, which facilitate the searching, retrieval and administering of database 121 through server 120.

Data network 118 includes, but is not limited to, a LAN. The LAN may connect to other similar remote LANs to form WAN 40 in FIG. 1. LANs may be connected to one another and/or to the Internet via routers and/or other conventional means. Thus, data network 118 enables an operator to access public directory information, private directory information, and/or other information available over the Internet.

An operator may submit a request for a party's phone number (wireline or wireless), or other such communications number of a party's communications device, to database server 120 through operator terminal 114. Database server 120 may search directory assistance database 121 in response to the request. If a number is located, it is retrieved by database server 120.

Information assistance service provider 102 may also include voice response unit ("VRU") 122, which is also coupled to data network 118. VRU 122 plays the constantly repeated parts of an operator's speech, namely, the various greetings and signoffs (or closings), and the retrieved telephone number of the party requested by the customer, under the control of switch host computer 107. VRU 122 may also have voice recognition capability, so that it can interpret verbal statements made by a customer. For example, instead of connecting a call to an operator, switch host computer 107 may connect the call to VRU 122, which may request that the customer recite a requested party's name, as discussed further, below.

VRU 122 may comprise a general purpose computer including memory 122a and one or more voice cards for voice recognition, voice recording and playback, and call progress analysis. VRU 122 is connected to servicing switch 106 via a T1 line. If more than one VRU 122 is provided, each one is connected to switch 106 via a separate T1 link. VRU 122 is also coupled to switch host computer 107 through data network 118.

At appropriate stages in a call's progression, host computer 107 initiates a voice path connection between VRU 122 and switch 106, such that the customer or the operator and the operator are able to hear whatever pre-recorded speech is played on that connection by VRU 122. Computer 107 then instructs VRU 122, via data network 118, what type of message to play, and passes data parameters that enable VRU 122 to locate the message appropriate to the call state.

To access IASP 100 of information assistance service system 10, customers of a particular telephone carrier or company may dial, speak or otherwise communicate the access digits, access codes or retail numbers established for information assistance by that carrier to access information assistance service system 10. For example, the predetermined access digits may be "411," "*555," "555-1212," "1-800-555-1212," "00," or other designated access numbers. Upon receiving such access digits from a customer's communications device, the participating telephone carrier's switching system routes the call to an IASC 100 of information assistance service system 10(via a T1 link), where it appears as an incoming call. Customers and other users of information assistance service system 10 may also call the system directly, in which case the call is also received by servicing switch 106 along one of the T1 links 108.

To connect a call to an IASC 100, a carrier network switch (not shown) of a participating carrier sends call setup signals containing data concerning the call, such as an ANI of the originating communications device, a dialed number identification string (DNIS) identifying the dialed telephone number or other such communications number, the area of the call's originating site, and/or a customer identification number assigned by the carrier, to servicing switch 106. The received set-up signals are monitored and processed by switch host computer 107, which assigns a call sequence number to the call, to uniquely identify the call within the information assistance system 100. A CDR is created for each call by switch 106, based on this information.

The call may be directed to an operator device, such as operator telephone 112 and operator terminal 116 of an available operator, by switch 106 under the control of switch host computer 107. Automatic call distribution (ACD) logic, which may reside in switch host computer 107 or elsewhere in system 100, may be used to queue (if necessary) and distribute calls to available operators at operator devices in the order in which they are received, to evenly distribute the call traffic among the operators. Other distribution logic schemes may be used, instead, such as skills-based routing or a priority scheme for preferred callers.

After connection to an operator, a customer may request the phone number of a party (referred to as a "requested party"). The requested party's address may be requested, as well. The operator may enter the name of the requested party into a field of a graphical user interface ("GUI"), which may be a form template appearing on the display of the operator's terminal 116, through a keyboard or other such input device. The entered name is stored in memory 114a in a location corresponding to the name field of the GUI. The operator submits the requested party's name to database server 120 via data network 118 by clicking on a button or tab on the screen or depressing a key on the keyboard. Database server 120 stores the name in memory 120a and conducts a search of directory database 121 for a communications number associated with the name. The name may be stored in switch host computer memory 107a when the name is submitted to database server 120, as well. Database server 120 may not find a communications number corresponding to the exact name given by the customer, in database 121. The name might be in a different form. For example, in the database, only the first initial of the first name may be stored with the last name. The customer may give a nickname instead of the full first name, as well. Database server may store the name as it appears on the database in memory 120a, as well as the name given by the customer. The name inserted into the CDR, and ultimately the bill, is preferably the name given by the customer, which is input to IASP 100 and stored in memory. Alternatively, the name as it appears in the database may be used, instead. In that case, the name may be retrieved from the database, stored in memory and copied into an event record.

If a phone number or other such communications number corresponding to the requested party's name is found, the number may be stored in memory 120a and may then be sent to the requesting operator terminal 114 by database server 120. The retrieved number may be stored in memory 114a and displayed on the operator's monitor. The customer may be verbally informed of the number by the operator. Alternatively, the number may be provided to VRU 122 via switch host computer 107, and stored in memory 122a. VRU 122 may then generate a message reciting the number.

The name may be input by a customer using a keypad on their communications device, as well.

The information assistance call may then be terminated or the customer may be given the option of being connected with the communications number (i.e. telephone number) of the requested party, as is known in the art. The option may be presented by the operator or by VRU 122. The customer may accept the option by a verbal indication to the operator or VRU 122 or by entry of data through the customer's phone or other communications device. Entry of data may involve depression of one or more particular keys on a keypad of the communications device, for example. If the call is connected to the requested party, servicing switch 106 sends call setup signals for the call, including the requested party's number as a DNIS, to a carrier switch. The information assistance call is completed. The connection between the customer and the IASP 10 may be terminated or it may be maintained in order to provide additional information assistance via the well-known StarBack(R) feature.

Instead of connecting the call to an operator at an operator device, switch host computer 107 may connect the call to VRU 122 to request verbal input of a requested party's name and/or to present other options, as is known in the art. If VRU 122 can identify the name, the name is stored in VRU memory 122a and conveyed to data server 120 via data network 118, to conduct a search, as described above. If VRU 122 cannot identify the requested party's name, the call is connected to an operator device by switch host computer 107 for handling by an operator, as described above.

As discussed above, each component of IASC 100 involved in an "event" or activity may generate an event record or CDR to document the event and provide data for billing. For example, when a communication is received, servicing switch 106 may generate a CDR, under the control of switch host computer 107. When the communication is connected to an operator telephone 112 and terminal 114, terminal 114 or switch host computer 107 may generate a CDR. If the call is queued, switch host computer 107 may generate a CDR. When the operator sends a search request such as a search for a phone number corresponding to a requested party's name, terminal 114 may generate a CDR. When database service 120 conducts a search, database server 120 may generate a CDR. Generation of multiple event records is discussed in application Ser. No. 09/777,061, filed on Feb. 5, 2001, assigned to the assignee of the present invention and incorporated by reference, herein.

In accordance with an embodiment of the present invention, a CDR includes an indicator of the requested party, such as the requested party's name and/or address, facilitating generation of a bill including the indicator. Embodiments of the invention may be implemented where CDRs are generated by multiple respective components of IASP 100, as described above and in application Ser. No. 09/777,061, or only one CDR is generated, such as by servicing switch 106. If multiple CDRs are generated by multiple components of IASP 100, any one including an indicator of the requested party may be used to provide the requested party's name to billing platform 30. In accordance with certain embodiments of the invention, an original CDR may be generated including a name field. The name field may be populated, along with other fields of the CDR, when the CDR is first generated. The generation and population of the CDR may take place in real-time, while the communication is being handled by IASP 100. it is not, therefore, necessary to modify a CDR later, during bill processing, as in the prior art. In other words, an indicator, such as a name and/or address, may be inserted into an original CDR.

Figure 3:
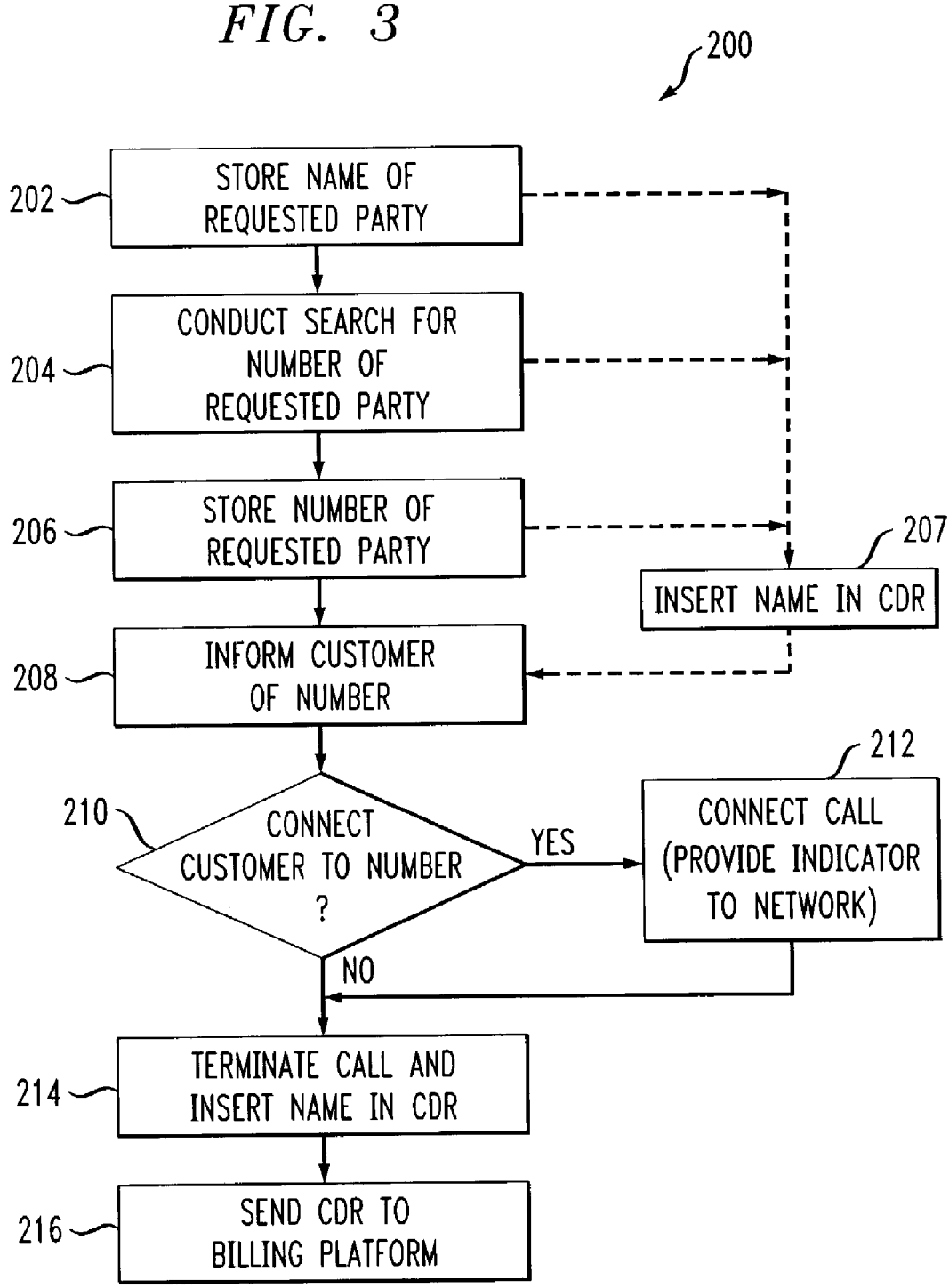
FIG. 3 is a flowchart of a method in accordance with an embodiment of the invention.

A method in accordance with an embodiment of the invention will now be described with respect to the flowchart 200 of FIG. 3.

Upon receipt of a request for the phone number of a party from the customer, the name of a requested party is stored in step 202. The name may be stored in memory 114a when the operator enters the requested party's name into a field of a GUI, through a keyboard or other such input device, for example. If the communication is being handled by VRU 122, the requested party's name may be stored in VRU memory 122a.

A search for the requested party's phone number or other such communications number is conducted in step 204. A request for a party's address may also be made. For example, the operator may submit the requested party's name entered in the GUI to database server 120 via data network 118 by clicking on a button or tab on the GUI or by depressing a key on the keyboard. If the requested party's name has been submitted to VRU 122, the name may be conveyed from VRU memory 122a to data server 120 via data network 118. The name may be stored in memory 120a in database server 120, which then conducts a search of directory database 121.

The number of the requested party is stored in step 206. For example, the number may be initially stored in memory 120a of database server 120. It may then be conveyed via data network 118 to memory 114a in the operator terminal 114 and displayed to the operator, or to memory 122a in VRU 122, for example. The number may also be conveyed to memory 107a in switch host computer 107.

The customer is informed of the number in step 208. The customer may be informed verbally by the operator, who may read the number displayed at terminal 114, or by a message generated by VRU 122.

After the number of the requested party is provided to the customer in step 208, the customer may be given the option of being connected with the located number, in step 210. The option may be presented by the operator or VRU 122. The customer may select one of the options by a verbal indication to the operator or VRU 122 or by entry of data through the customer's phone or other communications device. Entry of data may involve depression of one or more particular keys on a keypad of the communications device, for example.

If the customer accepts the option, the call is connected to the number, in step 212, via a carrier network, as is known in the art. The communication with IASC 100 is terminated and the requested party's name may be inserted into a CDR, in step 214. The operator may terminate the communication by clicking on a COMPLETE button or tab on the GUI or depressing a key on the keyboard, for example. The communication between the customer and the IASC 100 is then disconnected. In step 214, the requested party's name may be transferred from the field in the GUI to a name field in the CDR upon the operator's indication of the completion of the communication or upon the disconnection of the communication, by terminal 114 or switch host computer 107.

If the customer declines the option of being connected to the requested party in step 210 or if the system does not offer that option, the call is terminated and the requested party's indicator, such as their name and/or address, may be inserted into a CDR in step 214 by switch 106, for example, as discussed above.

The requested party's name may be inserted into a CDR at other steps in the process, in addition to or instead of in step 214. For example, if the components of IASP 100 have the capability of generating CDRs, as described in application Ser. No. 09/777,061, described in more detail above, operator terminal 114 or VRU 122 may copy the requested party's name from memory 114a or 122a, respectively, into a CDR under the control of switch host computer 107, after the requested party's name is stored in step 202. Database server 120 may copy the requested party's name from memory 120a into a CDR during documentation of the conducting of a search or the retrieval of a number, after step 204 or step 205. Database server 120 may copy the requested party's address from database 120a into memory 120a and into a CDR, as well. Switch host computer 107 could also acquire the requested party's name, store it in memory 107a and copy it into a CDR at any point.

The CDR is sent to a billing platform in step 216. As discussed above, the billing platform, such as billing platform 30, may be part of the information assistance service system 10, a carrier or a third party.

As discussed above, billing platform 30 may generate final bills or precursors to bills. Information assistance service system 10 may offer to provide billing entries with indicators, such as a party's name and/or address, as an option to customers. Customers may select an option among the following, for example: 1) providing both name and address, 2) providing the name or address, 3) providing another indicator or 4) providing no indicators. The customer may make such a selection during registration or any time after that. The customer may change their selection at any time. Based on the option selected by the customer, information assistance service system 10 may format a bill into a final form.

After the call is connected to the requested party via a carrier network in step 212, the carrier network will also generate CDRs related to the call. IASP 100 may pass the name and/or address of the requested party to the carrier network, along with the requested party's communication number, in the call setup signal stream typically provided by IASP 100 to the carrier network to enable call connection, via switch 106. The name and/or address may also be provided to the carrier network by IASP 100, via an Internet Protocol Detail Record ("IPDR"), sent via database network 118, which the carrier network can correlate with the CDRs it generates. For example, the IPDR and CDRs generated by the carrier network may be correlated through the ANI of the customer and the time and date of the call and/or the call sequence number assigned to that communication. Alternatively, the carrier network may acquire the name and/or address of the party to whom the call is being connected by searching a database, as discussed below.

As mentioned above, the customer may be connected back to the information assistance service system in accordance with the Starback® Service offered by the assignee of the present invention and described in U.S. Pat. No. 5,797,092, for example, which is assigned to the assignee of the present invention and is incorporated by reference herein. CDRs would typically be generated to document the connection back to the system. If the customer requests a new search for a communications number associated with a third party, CDRs may be generated including an indicator associated with the third party, such as a name and/or address of the third party, by repeating the steps of method 200.

Figure 4:
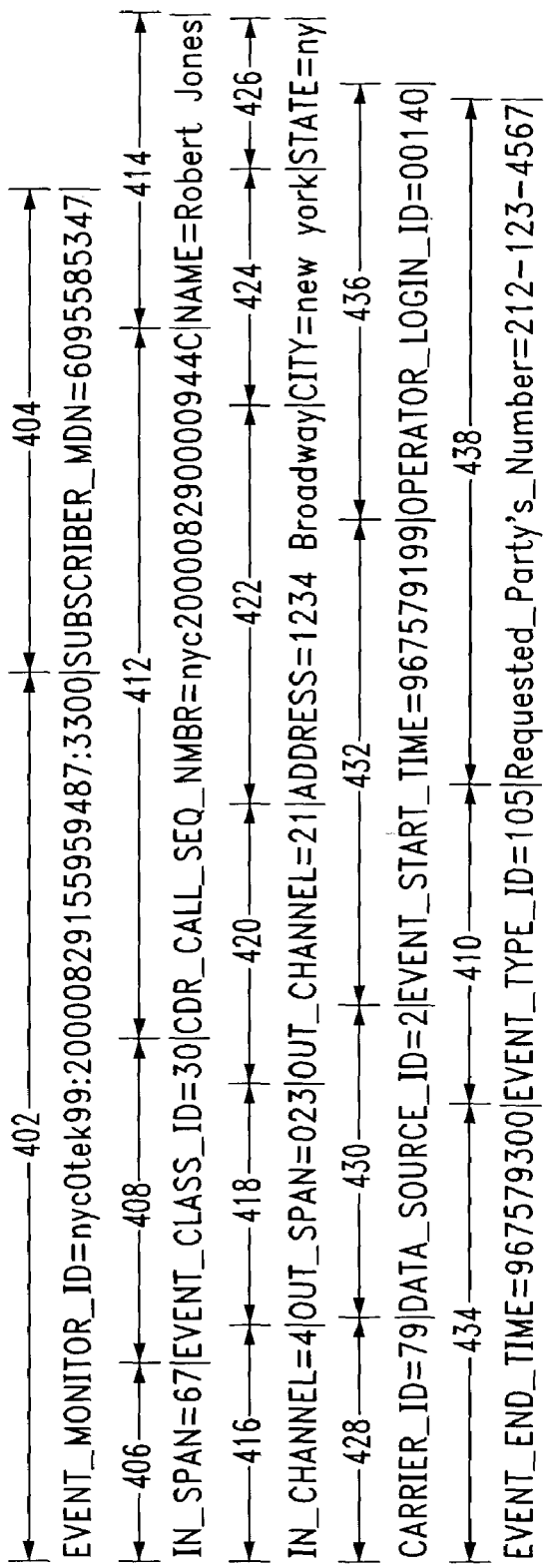
FIG. 4 is an example of a CDR for a directory assistance call, including a name and address of a requested party.

FIG. 4 illustrates an example of a CDR 400 that may be generated by IASP 100 to document an information assistance search during an information assistance call. The CDR may include multiple fields describing an information assistance communication. Specifically, EVENT_MONITOR_ID field 402 contains a sequence of alphanumeric characters uniquely identifying CDR 400. SUBSCRIBER_MDN field 404 identifies the telephone number of the customer who made the information assistance call, i.e., the automatic number identification (ANI). IN_SPAN field 406 identifies the T1 span transporting the incoming communication of the information assistance call.

EVENT_CLASS_ID field 408 is an optional field that may be used to identify a class of an event where CDRs are generated for multiple events, as described in application Ser. No. 09/777,061, discussed above. For example, the value "30" in field 211 in this instance, corresponds to a SEARCHES class. Other values for field 211 may correspond, e.g., to CALL PROCESSING, VALUE ADDED SERVICE and LOCAL SERVICES classes. Another field, here EVENT_TYPE_ID field 410, specifies one of the event types within the class identified by the value in field 408. For example, the value "105" in field 410 in this instance, corresponds to a search for a number of a requested party event within the SEARCHES class. Similarly, other values for field 410 correspond to different types of events in an identified class.

CDR_CALL_SEQ_NMBR field 412 contains a sequence number identifying the information assistance call in question. If multiple event records are generated in the same information assistance communication to document different events taking place during the communication, as described in application Ser. No. 09/777,061, for example, they would share the same value in field 412. In that way, billing compiler 34 may identify and compile event records related to the same communication, as discussed above. Sequence numbers are generated and assigned by switch host computer 107, when the information assistance call is initially received by service switch 106. Host computer 107 then transmits the sequence number to switch 106, and any other component in IASP 100 that may generate an event record. For example, the sequence number for a call may be transmitted to operator terminal 114, voice response unit 122 and database server 120 to be incorporated in any CDR they generate, for that particular call.

In accordance with an embodiment of the invention, NAME field 414 contains a name of a requested party. As discussed above, terminal 114, database server 120, VRU 122 and/or switch host computer 107 may generate a CDR and populate NAME field 414.

IN_CHANNEL field 416 identifies the channel (within the T1 span identified by IN_SPAN field 406 described above), which the incoming communication of the information assistance call traverses. OUT_SPAN field 418 identifies the T1 span transporting the outgoing communication of the information assistance call, if any. OUT_CHANNEL field 420 identifies the channel (within the T1 span identified by field 418) which the outgoing communication of the information assistance call traverses, if the communication is connected to the requested party's communications number, for example.

An optional ADDRESS field 422 may contain the address of the requested party. CITY field 424 contains the name of the city, such as New York, in which the requested party is located. STATE field 426 contains the name of the state in which the requested party is located. CARRIER_ID field 428 identifies the network carrier used to connect the call. For example, the value "79" in field 424 identifies AT&T Corp. as the carrier in this instance. DATA_SOURCE_ID field 430 identifies the component of IASP 100 generating record 400. EVENT_START_TIME field 432 indicates the start time of the communication event in question. It should be noted that the value in field 432 corresponds to a UNIX "epoch" time, i.e., the number of seconds elapsed from Jan. 1, 1970. Similarly, EVENT_END_TIME field 434 indicates the end time of the event in question. Thus, with such event start and end times, the duration of the event in question can be determined, which may be used in computing charges for that call. OPERATOR_LOGIN_ID field 436 identifies the operator handling the event. The REQUESTED_PARTY'S_NUMBER field 438 may contain the retrieved number of the requested party.

Records of events which occurred in a call may be correlated by the same sequence identification number, such as CDR_CALL_SEQ_NMBR field 412 in FIG. 4, identifying the call. Each information assistance call is associated with customer information, such as ANI or SUBSCRIBER_MDN field 404 information as shown in FIG. 4, and/or a customer identification number assigned by the carrier.

Other fields, different fields and fewer fields may be provided in CDR 400, as desired or needed by the communications system.

CDR 400 includes all information necessary for computation of charges for each call, so that bill processing may be readily performed. An additional field or fields may be provided in the bill for containing the requested party's name and/or address, or other such indicator. A bill may be readily formatted to provide such a field by CDR server 36, for example.

Figure 5:
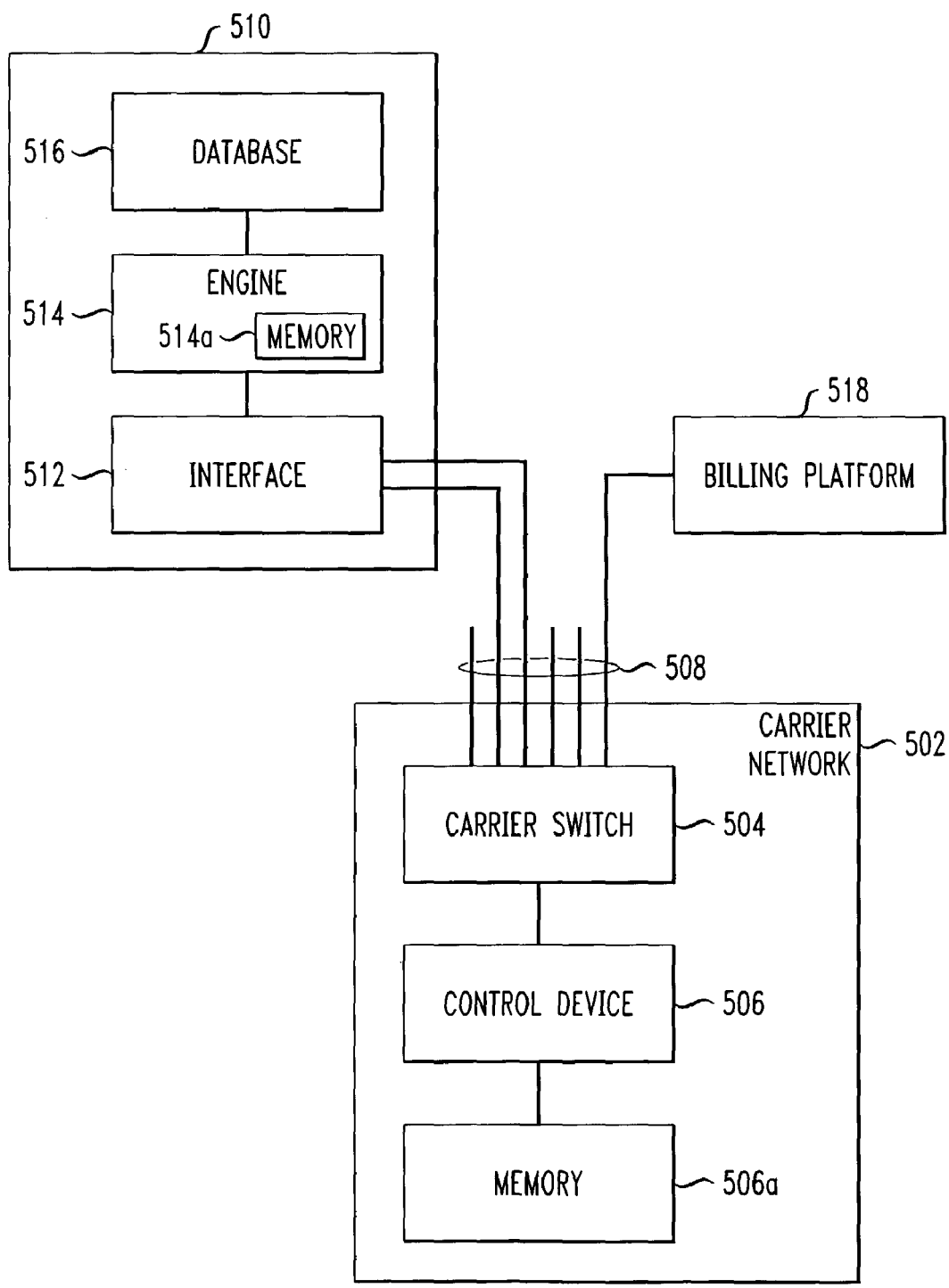
FIG. 5 is a block diagram of a carrier network and associated systems in another embodiment of the invention.

IASP 100 may readily insert a terminating party's name into a CDR, such as CDR 400, since the requested party's name is provided by the customer. FIG. 5 is a block diagram of a system enabling a telephone carrier network, such as Verizon Communications, which also generates CDRs to document events in processing communications between parties, to identify and convey an indicator of the called party, such as the called party's name and/or address, into a CDR during processing of a communication, in accordance with another embodiment of the invention. In that way, telephone bills itemizing calls made through the carrier may also include the called party's name in the bill.

Carrier network 502 includes carrier switch 504 and control device 506 with memory 506a. Control device 506 may be a computer or processor, for example. Carrier switch 504 is connected through a data connection 508 to DIP database system 510, which provides a name and/or address of a party corresponding to a given communications number, upon request. DIP database system 510 includes an interface 512, an engine 514 with memory 514a and a database 516. DIP database system 510 may be part of the carrier network 502 or may be a third party system.

Database 516 correlates communications numbers, such as phone numbers, with the names of party's associated with respective numbers, and their addresses. It may be a directory assistance database, for example. While a directory assistance database is typically adapted to be searched for a communications number associated with a given name, database 516 may already be adapted to, or may readily be adapted to, be searched for a name associated with a communications number ("reverse search"). Requests for a name and/or address associated with a communications number are received by interface 512 and conveyed to engine 514, where the name and address are stored in memory 514a. Engine 514 searches database 516 for a name and/or address associated with the number. Engine 514 may be a processor, computer or server, for example.

Identified names and/or addresses are provided from DIP database 516 to engine 514, which stores the indicator in memory 514a and provides the indicator to carrier switch 504 via interface 512 and data connection 508. The indicator may be stored in memory 506a, for example. Carrier switch 504 typically generates an event record, such as a CDR, under the control of control device 506. In accordance with this embodiment of the invention, the party's name and/or address stored in memory 506a is copied into an appropriate field in the CDR.

This process preferably takes place as carrier switch 504 connects the calling party to the communications number of the called party. The CDR in FIG. 4 may be readily modified by eliminating inapplicable fields and adding new fields for use as a CDR in a carrier network system.

Billing platform 518 is coupled to originating switch 504. Billing platform 514, which may have the same configuration as billing platform 30 in FIG. 1, collects, stores and compiles CDRs and generates bills based on the CDRs, as discussed above. Billing platform 518 may be part of carrier network 502 or may be part of a third party contracted to do billing for the carrier, as is known in the art. Switch 504 sends the CDR to billing platform 518 after the call is connected.

Figure 6A:
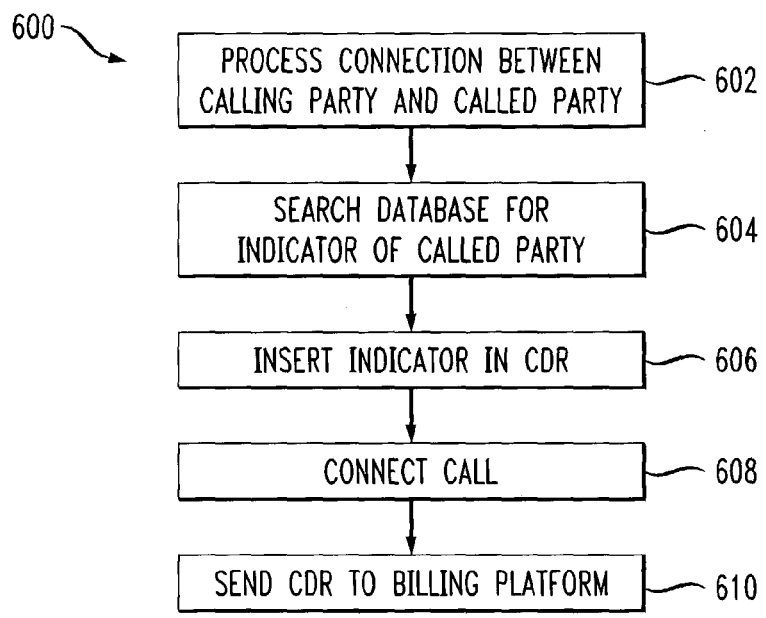
FIG. 6a is a flowchart of a method in accordance with another embodiment of the invention, for use by a carrier network, as in FIG. 5.

A method in accordance with this embodiment of the invention will now be described with respect to the flowchart 600 of FIG. 6a.

After carrier network 502 receives a communication, such as a telephone call, processing of a connection between the calling party and the called party is initiated in step 602.

As the connection is being processed, a search is conducted for the called party's name and/or address, in step 604. For example, switch 504 may provide the communications number of the called party to a search engine, such as engine 514 in FIG. 5, through an interface 512. The communications number may be a DNIS derived from the call setup signals, for example. Engine 514 searches database 516 for a party's name and/or address associated with the communications number of the called party. If the party's name and/or address is found, either or both are provided to switch 504 through engine 514 and interface 512.

The called party's name and/or address is then inserted into a CDR, in step 606. For example, switch 504 may insert the name into a name field of a CDR generated by the switch for that communication and insert the address into the address-related fields 422, 424, 426, under the control of control device 506.

Processing of the communication is completed and the call is connected in step 608.

After the call is connected, the CDR is sent to a billing platform, such as billing platform 518, in step 610.

As mentioned above, database 516 may be an information assistance database, adapted to retrieve party's names and/or addresses based on communications numbers. DIP database system 510 may therefore be part of an information assistance service system, such as part of IASP 100 of FIG. 2. In that case, engine 514 may be database server 120 and database 516 may be directory assistance database 121. An interface (not shown) may be provided for the carrier network 502 to access database server 120. The method of FIG. 6a may be implemented if the database system 510 is part of the carrier, part of the IASP 100 or part of another third party.

Bill processing may be readily performed, including insertion of a terminating party's name, with the CDR, as discussed above.

Figure 6B:
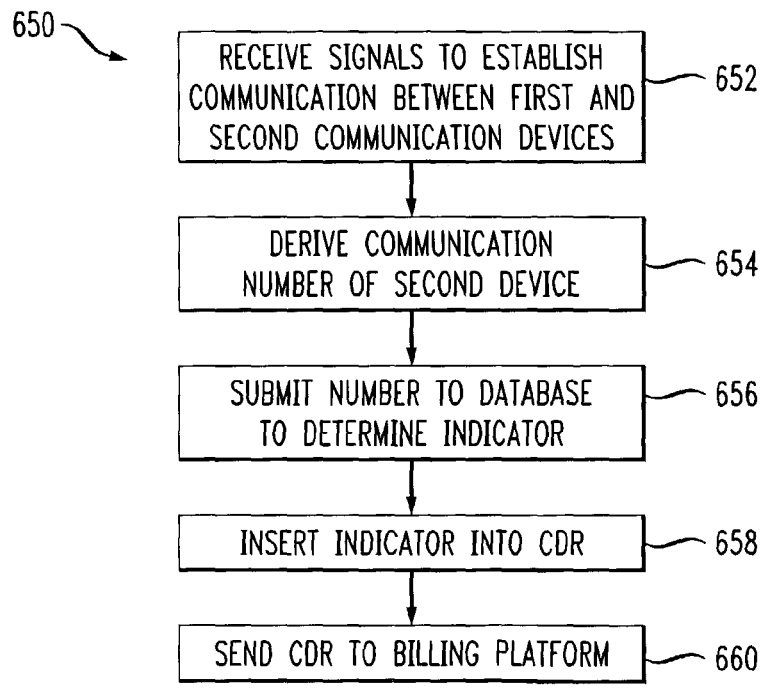
FIG. 6b is flowchart of another method in accordance with another embodiment of the invention, for use by a carrier network, as in FIG. 5.

Another method in accordance with another embodiment of the invention is explained with respect to flowchart 650 in FIG. 6b.

In accordance with this embodiment, signals are received to establish a communication between a first communications device of a first party and a second communications device of a second party, in step 652. For example, call set-up signals may be received from the first communications device of the first party, who is initiating a call to a second communications device of a second party.

The communications number of the second communications device is derived in step 654. The communications number may be a DNIS in the call set-up signals, for example.

The derived communications number is submitted to a database to determine the second party's name and/or address, in step 656. The database may correlate communications numbers with respective parties' names and addresses. The database may be a directory assistance database that is part of a carrier network 502, part of an IASP 100 of an information assistance service system 10 or a database system 510 of another third party.

If a name and/or address is retrieved from the database, it is inserted into a CDR or other such event record, in step 658. The name may be stored in memory 506a and copied into the CDR by carrier switch 504 under control of control device 506 or by control device 506 itself.

The CDR is then sent to a billing platform, such as billing platform 518, in step 660. This method may take place while the communication connection is being established.

IASPs 21 through 27 of FIG. 1 may be configured differently than the IASP 100 of FIG. 2. FIG. 7 illustrates an alternative IASP 700. Components common to IASC 100 of FIG. 2 are commonly numbered. In IASP 700, call interface 702 is not connected to servicing platform 104, as in IASP 200. Instead, the functionality of servicing platform 104 principally is carried out in carrier network 704. Control device 706 in network 704 performs similar functions as switch host computer 124, and interface/carrier switch 708 performs not only its conventional carrier switching functions, but also those of servicing switch 120 described above, under control of control device 706. Control device 706 may include memory 707. Carrier switch 708 generates CDRs to document events conducted by carrier network 704.

In IASP 700, a communication, such as an information assistance call, is recognized by control device 706 when it is routed through carrier switch 708. Device 706 causes the communication to be connected through one of pre-designated direct inward dial (DID) connections 710 to provider 700. Control device 706 may also be connected to IASP 700 via an Internet connection 712. The communication is received by call interface 702 therein. Interface 702, coupled to operator telephones 112 and coupled to operator terminals 114 via data network 118, includes the aforementioned ACD logic for distributing the call to an operator at one of telephones in a conventional manner. Requests for information assistance are handled in the same manner as described above.

In IASP 700, a requested party's name may be inserted into a CDR in a variety of manners. Operator terminal 114, VRU 122 and/or database server 120, which may each have associated memory as shown in FIG. 2 and not shown in this view, may generate a CDR and insert the requested party's name into a field of the CDR, as described above. The method of the embodiment of FIG. 3 may be implemented, for example. Those CDRs may be correlated with CDRs generated by carrier network 704, as discussed above.

The name and/or address or other such indicator of a requested party may also be provided by IASP 700 to carrier network 704 via a data connection, such as Internet connection 712. Control device 706 may store the indicator in memory 707 and copy the requested party's name into the CDR generated by carrier switch 708, for example.

In another alternative, carrier switch 708 may be coupled to database server 120 though an interface 718, in a similar manner as carrier switch 504 is coupled to interface 512 in the embodiment of FIG. 5. In this case, the methods of FIGS. 6a and 6b may be implemented.

The communications systems described above may be implemented with in-band, feature group D (FGD) type signaling, SS7 out-of-band signaling or other signaling for communications between switches (including carrier switches). Where SS7 out-of-band signaling is used, the communications systems receive the call set-up signals and call progress information (busy, ring-no-answer, number unavailable, answer supervision, etc.) coming from an SS7 signaling link, separate from the voice trunk.

While information assistance service system 10 and IASP 100 are accessed via a telephone network in the embodiments described above, it is understood that system 10 and IASP 100 may be accessed via other types of networks, such as the Internet or a WAN. In the case of the Internet, the ANI may be replaced by a URL, using conventional networking and computer equipment.

The communications systems and their components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. In addition, while parties' names are stored in different memory devices associated with different components of the IASP 100, party's names may be stored in different locations in the same memory device.

The foregoing merely illustrates the principles of the invention. It will thus be appreciated that those skilled in the art will be able to devise numerous other arrangements that embody the principles of the invention and are thus within the spirit and scope of the invention, which is defined by the claims, below.

What is claimed is:

1. A method of operating an information assistance service system, comprising:
    establishing a communication with a first party seeking connection information concerning a second party;
    eliciting a name of the second party from the first party; and
    generating an event record including at least the name of the second party during the communication.

2. The method of claim 1, further comprising eliciting from the first party location information concerning the second party.

3. The method of claim 1, wherein the the name of the second party is derived from the location information.

4. The method of claim 1, further comprising:
    storing the name of the second party in a memory location; and
    copying the name stored in the memory location into the event record.

5. The method of claim 4, further comprising:
    copying the name stored in the first memory location into a second memory location; and
    copying the name stored in the second memory location into the event record.

6. The method of claim 5, wherein the second memory location is associated with a database server, the method further comprising:
    searching a database for a communications number associated with the name stored in the second memory location.

7. The method of claim 6, further comprising:
    searching at least a selected one of a national, local, a private, a proprietary, a shared and an international database.

8. The method of claim 4, further comprising:
    storing the second party's name in the first memory location via an input device.

9. The method of claim 8, further comprising:
    storing the second party's name in the first memory location via an input device operated by an operator.

10. The method of claim 4, further comprising:
    storing the second party's name in the first memory location via a voice recognition unit.

11. The method of claim 4, further comprising:
    sending the event record including the second party's name to a billing platform.

12. The method of claim 1, further comprising:
sending the event record to a billing platform.

13. The method of claim 12, wherein the billing platform is part of the information assistance service system, part of a carrier or part of another third party.

14. The method of claim 1, further comprising:
connecting the first party to the second party.

15. The method of claim 1, further comprising:
re-establishing a second communication with the information assistance service system;
receiving a name of a third party from the first party; and
generating a second event record including at least one indicator related to the second communication.

16. An information assistance communications system, comprising:
means for receiving signals to establish a communication with a first party requesting connection information concerning the second party;
means for eliciting a name of the second party from the first party; and
means for generating an event record including at least the name of the second party during the communication.

17. An information assistance communications system, comprising:
an interface to receive signals to establish a communication with a first party requesting connection information concerning a second party;
a device for eliciting a name of the second party from the first party; and
a processor coupled to the interface, the processor being programmed to cause generation of an event record during the communication, the event record including at least the name of the second party.

18. The system of claim 17, further comprising:
a database correlating parties' names and corresponding communications numbers, the database being coupled to the processor;
wherein the processor is programmed to conduct a search of the database for a communications number associated with the second party.

19. The system of claim 18, wherein the database is a selected one of a national, a local, a private, a proprietary, a shared and an international database.

20. The system of claim 18, further comprising:
a database server coupled between the database and the processor;
wherein the processor is programmed to conduct a search by causing the second party's name to be submitted to the database server and the database server is programmed to search the database for a communications number associated with the second party's name.

21. The system of claim 20, further comprising:
an operator input device coupled to the database server to enable input of the second party's name.

22. The system of claim 20, further comprising:
a voice recognition unit coupled to the database server and to the interface to enable input of the second party's name.

23. The system of claim 20, further comprising:
memory to store a party's name to be searched;
wherein the processor is further programmed to cause the second party's name stored in memory to be inserted into the event record.

24. The system of claim 18, wherein the processor is further programmed to:
search the database for an address associated with the name; and
insert the address into the event record.

25. A method of operating a communications system, comprising:
processing a communications connection between a first communications device of a first party initiating a communication with a second communications device of a second party;
deriving a name of the second party based on information provided by the first party; and
generating an event record related to the communication, including at least the name of the second party, during the communications connection.

26. The method of claim 25, wherein the name of the second party is identified by searching a database based on the information.

27. The method of claim 26, wherein the database comprises a national, a local, a private, a proprietary, a shared or an international database.

28. The method of claim 25, further comprising:
transmitting the event record to a billing platform.

29. A communications system, comprising:
means for processing a communications connection between a first communications device of a first party initiating a communication and a second communications device of a second party;
deriving a name of the second party based on information provided by the first party; and
means for generating an event record related to the communication, including at least the name of the second party, during the communications connection.

30. A communications system for establishing a communication, comprising:
an interface to receive signals from a communications device of a first party to process a communications connection with a communications device of a second party;
deriving a name of the second party based on information provided by the first party; and
a processor programmed to generate an event record including at least the name of the second party, during the communications connection.

31. The communications system of claim 30, wherein the processor is programmed to:
generate the event record;
access a database correlating communications numbers with respective indicators of parties; and
insert a retrieved indicator into the event record, while the communications connection is being processed.

32. The communications system of claim 31, wherein the database is part of a third party.

33. The communications system of claim 32, wherein the third party is an information assistance service system.

34. The communications system of claim 30, further comprising:
a database correlating communications numbers with respective indicators of parties, the database being coupled to the processor.

35. The communications system of claim 34, further comprising:
an engine to search the database, the engine being between the processor and the database.

36. The communications system of claim 35, wherein the database comprises a selected one of a national, a local, a private, a proprietary, a shared and an international database.

37. A method of operating a communications system, comprising:
connecting an information assistance communication to an information assistance service system, wherein, in the communication, a first party is seeking a communications number of a second party;

establishing a communications connection between the first party and the second party after the communications number of the second party is identified;

inserting at least a name of the second party into an event record generated by the communications system associated with connecting the first party to the second party, while establishing the communications connection between the first party and the second party.

38. The method of claim 37, comprising:

searching a directory assistance database of an information assistance service system.

39. The method of claim 37, comprising:

receiving from the information assistance service system the name of the second party.

40. The method of claim 39, further comprising:

receiving the name by an Internet Protocol connection.

41. The method of claim 39, further comprising:

receiving the name from the information assistance service system, via a predetermined protocol.

42. The method of claim 37, further comprising:

inserting the address of the second party into the event record.

* * * * *

US006985569C1

(12) INTER PARTES REEXAMINATION CERTIFICATE (0394th)
United States Patent
Baker

(10) Number: US 6,985,569 C1
(45) Certificate Issued: Jun. 26, 2012

(54) SYSTEM AND METHOD FOR IDENTIFYING PARTIES IN BILLS FOR COMMUNICATIONS SERVICES

(75) Inventor: Nathan Bryant Baker, Tigard, OR (US)

(73) Assignee: Grape Technology Group, Inc., Bethlehem, PA (US)

Reexamination Request:
No. 95/001,163, Mar. 31, 2009

Reexamination Certificate for:
Patent No.: 6,985,569
Issued: Jan. 10, 2006
Appl. No.: 10/376,935
Filed: Feb. 28, 2003

(51) Int. Cl.
*H04M 15/00* (2006.01)
*H04M 3/42* (2006.01)

(52) U.S. Cl. .................................... 379/126; 379/218.01
(58) Field of Classification Search .......................... None
See application file for complete search history.

(56) References Cited

To view the complete listing of prior art documents cited during the proceeding for Reexamination Control Number 95/001,163, please refer to the USPTO's public Patent Application Information Retrieval (PAIR) system under the Display References tab.

*Primary Examiner* — Deandra Hughes

(57) ABSTRACT

In an information assistance system, when a first party calls the service to request a communications number (i.e., phone number) of a second party, an indicator of the second party, such as the second party's name, is inserted into an event record to be provided to a billing platform. The indicator may also be the second party's address, instead of or along with the second party's name. The name may thereby be readily provided in a bill for the call. In a carrier network, the name of a second party called by a first party is inserted in an event record, so that the second party's name may be included in a bill for the call. The name may be determined by submitting the second party's communications number, which may be derived from call set up signals, to a database correlating communications numbers with corresponding parties' names. This may take place while the communication is being connected. Methods and systems are disclosed.

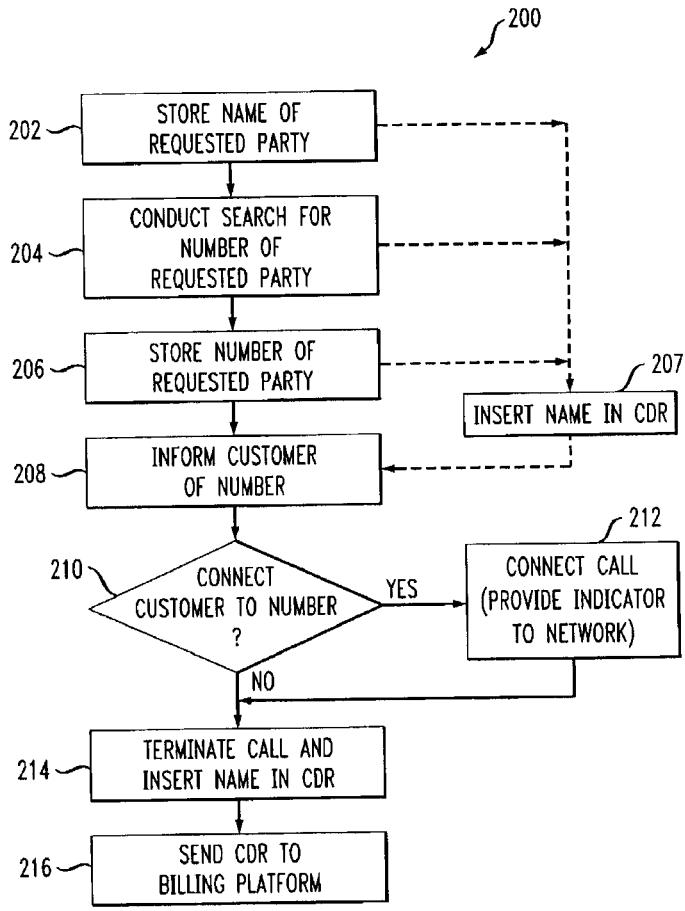

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 20-24, 31-33, 35-36 and 39-41 is confirmed.

Claims 1-19, 25-30, 34, 37-38 and 42 are cancelled.

\* \* \* \* \*